United States Patent
Mazzer

(10) Patent No.: US 6,734,365 B2
(45) Date of Patent: May 11, 2004

(54) PROTECTIVE SHEATH

(75) Inventor: Giacomo Ezio Mazzer, Erba (IT)

(73) Assignee: Mazzer Materie Plastiche di Giacomo Ezio Mazzer & C. S.n.c., Ponte Lambro (IT)

( * ) Notice: Subject to any disclaimer, the term of this patent is extended or adjusted under 35 U.S.C. 154(b) by 0 days.

(21) Appl. No.: 10/129,358

(22) PCT Filed: Sep. 27, 2001

(86) PCT No.: PCT/IT01/00496

§ 371 (c)(1),
(2), (4) Date: May 3, 2002

(87) PCT Pub. No.: WO02/29307

PCT Pub. Date: Apr. 11, 2002

(65) Prior Publication Data

US 2002/0153161 A1 Oct. 24, 2002

(30) Foreign Application Priority Data

Oct. 6, 2000 (IT) ..................................... MI2000U0564

(51) Int. Cl.[7] .................................................. H01B 7/18
(52) U.S. Cl. .............................. 174/121 A; 174/102 R; 174/108
(58) Field of Search ............................. 174/121 A, 36, 174/102 R, 102 SC, 108

(56) References Cited

U.S. PATENT DOCUMENTS

| | | |
|---|---|---|
| 3,616,123 A | 10/1971 | Reynolds, Jr. et al. |
| 3,913,625 A | 10/1975 | Gazda |
| 4,708,897 A * | 11/1987 | Douchy ...................... 428/34.1 |
| 4,791,966 A | 12/1988 | Eilentropp |
| 6,228,494 B1 * | 5/2001 | Emery ......................... 428/377 |

FOREIGN PATENT DOCUMENTS

WO 99/46534 9/1999

* cited by examiner

Primary Examiner—Chau N. Nguyen
(74) Attorney, Agent, or Firm—Wenderoth, Lind & Ponack, L.L.P.

(57) ABSTRACT

A protective sheath is intended to cover a flexible tube or hose used for conveyance of a working fluid to a hydraulic or pneumatic device, and is formed of a strip that is helically wound around an outer surface of the flexible tube. The strip comprises: a core of electrically insulating and flame retardant material; and a core-covering layer of electrically conductive and flame retardant material having a first surface portion intended to contact the outer surface of the flexible tube, and a second surface portion opposite to the first surface portion and forming an on sight surface of the strip when it is wound around the flexible tube. The core-covering layer of electrically conductive material dissipates electrostatic charges which are formed on the outer surface of the flexible tube, and protects the outer surface of the flexible tube from wear and flame by performing a flame retardant action.

10 Claims, 1 Drawing Sheet

PROTECTIVE SHEATH

TECHNICAL FIELD

The present invention generally relates to a sheath intended to cover, for protective purposes, a flexible tube or hose of the kind used for conveying a working fluid in a hydraulic or pneumatic circuit, in addition to flexible tubes of other kinds.

BACKGROUND ART

Use of protective sheaths to cover flexible tubes or hoses conveying a working fluid, by which hydraulic or pneumatic devices of a piece of equipment are actuated, is known in the art. Generally, the sheaths consist of a rather flexible strip of plastic material that is helically wound around an outer surface of the flexible tubes. A main object of the sheaths is to protect the flexible tubes from wear consequent to continued action of friction, for example, when the movable members of a piece of equipment rub against the flexible tubes during movement relative thereto.

Because pieces of equipment, whereon hydraulic or pneumatic devices are installed, frequently operate in extreme working conditions with regard to mechanical and thermal stresses, protective sheaths must provide, apart from a good resistance to abrasion, also a good resistance to flame, i.e. plastic material from which a sheath is made from should be, as much as possible, a flame retardant material. Another feature the protective sheaths should have is to be electrically conductive so as to permit the electrostatic charges, which form locally on surface portions of a flexible tube because of a frictional electrification phenomenon when a working fluid having insulating properties is passed through the tube, to be dissipated to earth. These electrostatic charges, if not suitably dissipated, may accumulate in such an amount that they generate a high electric potential gradient with respect to earth and produce dangerous electric discharges through working ambient air. For this reason, material from which the protective sheath is made should have an electrical resistance per unit length that is not greater than a fixed value which is established by International Standards so as to effectively dissipate the electrostatic charges.

For a purpose of making sheaths electrically conductive, the sheaths comprise a portion of electrically conductive material, for example in the form of a conductive wire or strip which follows a helical path of a sheath along an entire length thereof and is kept in contact with an outer surface of a flexible tube when the sheath is wound thereon.

However, sheaths of the above-mentioned kind suffer from some disadvantages among which include: high cost of an electrically conductive wire or strip; reduced flexibility of a sheath due to presence of the electrically conductive wire or strip; and the high manufacturing cost of the sheath.

Another disadvantage of a protective sheath of the above-mentioned kind relates to the fact that with a conventional manufacturing process a portion of the electrically conductive wire or strip intended to contact the outer surface of the tube may be covered by insulating plastic material of the sheath, whereby the insulating plastic material is interposed between the outer surface of the flexible tube and the electrically conductive wire or strip and negatively affects capability of the sheath to dissipate electrostatic charges locally formed on outer surface portions of the flexible tube.

SUMMARY OF THE INVENTION

An object of the present invention is to provide a protective sheath with improved features with regards to its ability to resist abrasion and flame and to be electrically conductive, and which sheath is adapted to assure during operation a degree of safety and reliability greater than that obtainable with prior art protective sheaths which are available on the market.

According to the present invention, a protective sheath intended to cover a flexible tube, used for conveyance of a working fluid to a hydraulic or pneumatic device, is formed of a strip which is helically wound around an outer surface of the flexible tube and is characterized in that the strip comprises:

- a core of electrically insulating and flame retardant material; and
- a core-covering layer of electrically conductive and flame retardant material having a first surface portion intended to contact the outer surface of the flexible tube, and a second surface portion opposite to the first surface portion and forming an on sight surface of the strip when it is wound around the flexible tube,
- with the core-covering layer of electrically conductive material being intended to dissipate electrostatic charges which are formed on the outer surface of the flexible tube, and to protect the outer surface of the flexible tube from wear and flame by performing a flame retardant action.

BRIEF DESCRIPTION OF DRAWINGS

The present invention will be now described with reference to the accompanying drawings, wherein.

DETAILED DESCRIPTION OF THE PREFERRED EMBODIMENTS

Figure 3:
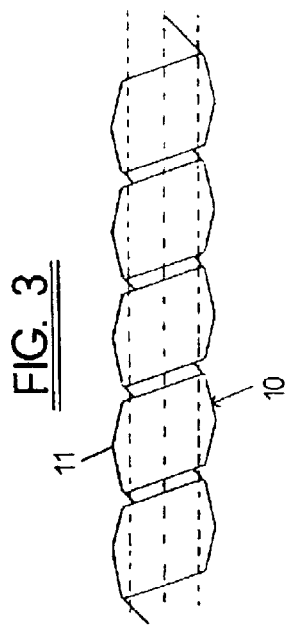
FIG. 3 is a partial side elevational view of another embodiment of the protective sheath of the present invention.
Figure 4:
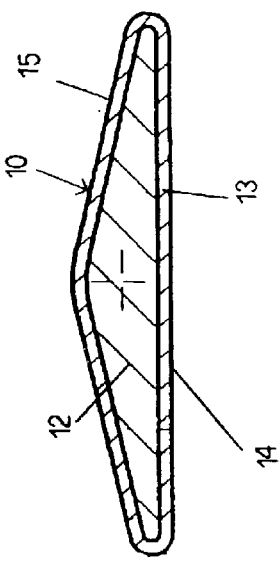
FIG. 4 is a cross-sectional view of a strip forming the protective sheath of the present invention.
Figure 1:
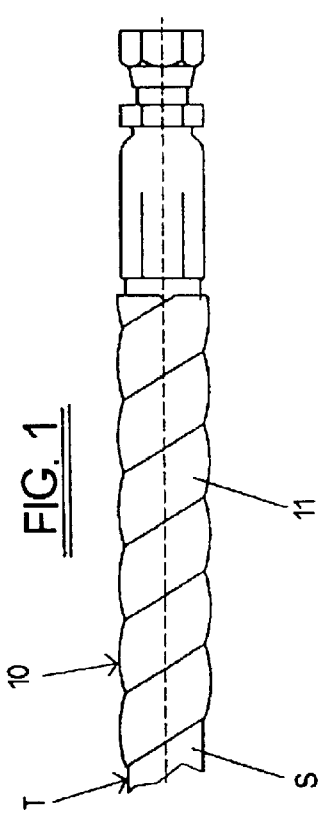
FIG. 1 is a partial side elevational view of a flexible tube, used for conveyance of a working fluid in a hydraulic or pneumatic circuit, with a protective sheath according to the present invention wound thereon.
Figure 2:
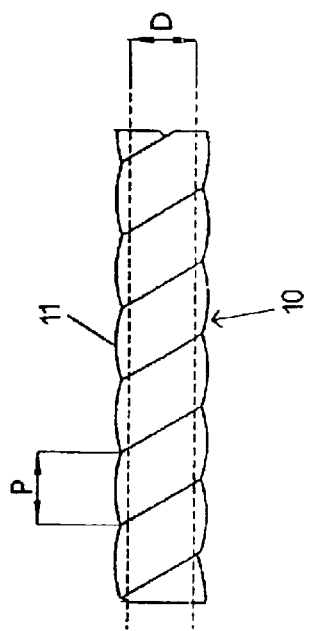
FIG. 2 is a partial side elevational view of the protective sheath of the present invention.

Referring to FIGS. 1, 2 and 3 of the drawings, there is shown a protective sheath of the present invention. The protective sheath consists of strip 10, having in cross-section various different shapes, which is helically wound around a flexible tube T and contacts an outer surface S of the tube. The protective sheath comprises a plurality of adjacent coils 11 which may be in contact one with another as shown in FIG. 2 or, alternatively, separated one from another by a gap as shown in FIG. 3. A pitch of the coils depends on an internal diameter D of the sheath, and generally increases with the internal diamter. Referring to FIG. 4 of the drawings, there is shown a possible shape of a cross-section of the strip 10 forming the protective sheath of the invention. As shown, the strip 10 comprises a core 12 and a core-covering layer 13 both formed of a flame retardant plastic material capable of protecting flexible tube T from wear caused by friction and from flame by performing a flame retardant action. Preferable plastic materials that may be used are polyethylene, polypropylene or plastic materials of other types.

In order to make the core-covering layer 13 electrically conductive, the plastic material thereof, according to a preferred embodiment ot the invention, comprises substances capable of reducing its electrical resistivity. For example, such substances may comprise additives such as carbon and metal oxide particles or the like. The core-covering layer 13 comprises a first surface portion 14 intended to contact the outer surface S of the flexible tube T, and an opposite second surface portion 15 forming an on sight surface of the strip when it is wound around the flexible tube. These first and second surface portions 14, 15 are connected to each other at side edges of the strip so that the core-covering layer 13 extends in continuity from the first surface portion 14 to the second surface portion 15 of the strip, thereby assuring contact between conductive core-covering layers of adjacent coils even when the sheath is bent so as to follow a curvature of the flexible tube.

Preferably, although not necessarily, the strip 10 may be of a triangular shape in cross-section with rounded corners, a base of which forms the first surface portion 14 intended to contact the outer surface S of the flexible tube T, and the other two sides of which form the second surface portion 15 forming the on sight surface portion of the strip when it is wound around the flexible tube.

The strip 10 forming the protective sheath may be manufactured according to a conventional co-extrusion process.

A thickness of the core-covering layer 13 may vary according to a desired electrical conductivity and wear resistance to be obtained.

When the strip is of a triangular shape in cross-section, at an apex thereof, formed by the two sides of the second surface portion 15, a thickness of the core-covering layer 13 may be increased in order to take into account greater wear which this portion is subject to.

INDUSTRIAL APPLICABILITY

The protective sheath according to the invention offers some advantages over other prior art sheaths.

In particular, a first advantage relates to the fact that electrical resistance of the sheath is less than that of other sheaths known in the art because contact between the outer surface S of the flexible tube T and the first surface portion 14 of the strip 10 forming the sheath extends along an entire width of the strip and is not restricted to a line or a narrow surface as occurs in sheaths provided with an electrically conductive wire of strip. This permits electrostatic charges formed on the outer surface of the flexible tube to be dissipated via a greater contact surface. Furthermore, since the side edges of adjacent coils of the strip are in contact when the sheath is bent so as to follow a curvature of the flexible tube, or when there is no gap between the coils even if the sheath is not bent, electrostatic charges may be dissipated not only along a helicoidal path of the protective sheath, but also along a path extending lengthwise of the sheath. Also, this feature greatly improves an ability of the sheath to dissipate electrostatic charges.

A second advantage is related to the fact that with a conventional manufacturing process there is no risk of interrupting electrical continuity of the electrically conductive core-covering layer 13 of the strip because the inner surface portion 14 of the strip always contacts the outer surface S of the flexible tube T, and moreover the strip is easier to check during and after manufacturing.

A third advantage of the protective sheath of the invention relates to the fact that the sheath can be manufactured via a conventional co-extrusion process, and electrical conductive material used for the core-covering layer 13 is less expensive than that used to produce an electrically conductive wire or strips of prior art sheaths.

What is claimed is:

1. A protective sheath for covering a flexible tube used for conveyance of a working fluid to a hydraulic or pneumatic device, comprising:
    a strip to be helically wound around an outer surface of a flexible tube, said strip including
    (i) an electrically insulating and flame retardant core, and
    (ii) an electrically conductive and flame retardant core-covering layer, said core-covering layer having a first surface portion to contact the outer surface of the flexible tube and a second surface portion, opposite said first surface portion, to form an on-sight surface of the sheath when said strip is wound around the outer surface of the flexible tube,
    wherein said core-covering layer is for dissipating electrostatic charges formed on the outer surface of the flexible tube and protecting the outer surface of the flexible tube from wear and flame, and
    wherein said strip has a triangular cross-section with rounded corners, with a base of said triangular cross-section corresponding to said first surface portion and two sides of said triangular cross-section corresponding to said second surface portion.

2. The protective sheath according to claim 1, wherein said core-covering layer continuously covers said core.

3. The protective sheath according to claim 1, wherein said core comprises a flame-retardant plastic material.

4. The protective sheath according to claim 1, wherein said core-covering layer comprises a flame retardant material including electrically conductive additives.

5. The protective sheath according to claim 4, wherein said core comprises a flame-retardant plastic material.

6. The protective sheath according to claim 5, wherein said core-covering layer continuously covers said core.

7. The protective sheath according to claim 6, wherein said core-covering layer has a thickness that is dependent on desired electrical conductivity and wear resistance of said core-covering layer.

8. The protective sheath according to claim 7, wherein said core and core-covering layer are co-extruded to form said strip.

9. The protective sheath according to claim 1, wherein said core-covering layer has a thickness that is dependent on desired electrical conductivity and wear resistance of said core-covering layer.

10. The protective sheath according to claim 1, wherein said core and core-covering layer are co-extruded to form said strip.

* * * * *